Patented Apr. 1, 1941

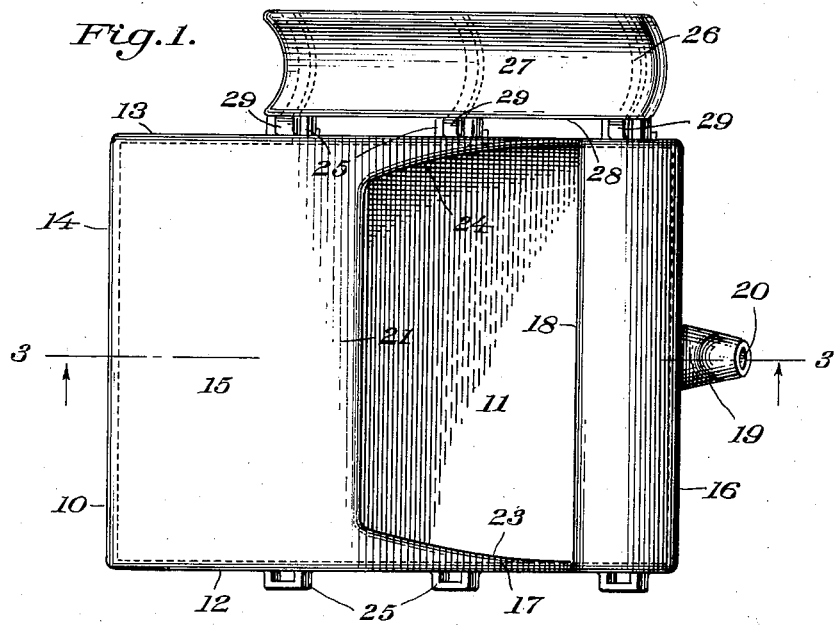
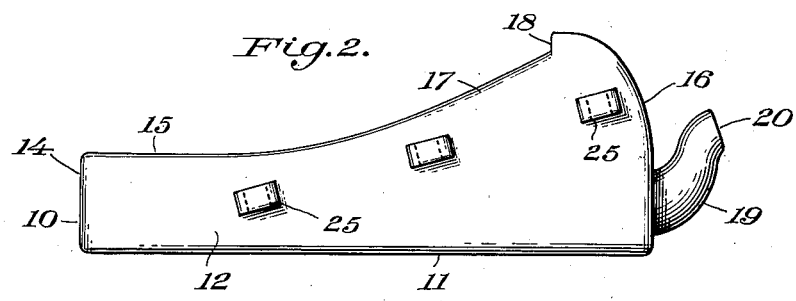
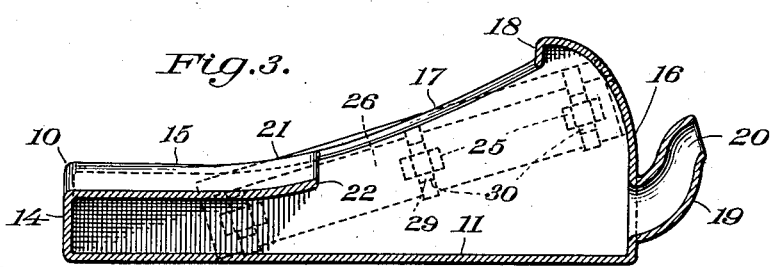

2,236,643

UNITED STATES PATENT OFFICE 2,236,643

BEDPAN

Harold Kemp, Miami, Fla.

Application August 1, 1939, Serial No. 287,825

5 Claims. (Cl. 4—112)

My invention relates to new and useful improvements in bedpans.

An important object of my invention is the provision of a sanitary bedpan that is adapted to comfortably accommodate the patient's body and that includes means to prevent splashing of the feces and micturition discharges from the pan and onto the bedding.

Another object of my invention is to provide a bedpan of the class described that is unique in its construction to permit the same to be easily emptied and cleaned.

Still another object of my invention is the provision of a bedpan having a novel arrangement of seat and leg supporting appendages upon which the patient or invalid is placed or seated and which cooperate in supporting the said patient in a relaxed and comfortable position.

Yet another object of my invention is the provision of a bedpan wherein the leg supporting appendages will support the legs of a patient in a weakened physical condition to permit an unrestrained peristaltic action.

Other objects and advantages of my invention will be apparent during the course of the following description.

In the drawing, forming a part of this specification, and in which like numerals are employed to designate like parts throughout the same, Figure 1 is a top plan view of a bedpan constructed in accordance with my invention, and showing one of the leg supports associated therewith, Figure 2 is a side elevation of the same, Figure 3 is a longitudinal sectional view, taken on the line 3—3 of Figure 1, and Figure 4 is a rear elevation of my device.

In the accompanying drawing, wherein for the purpose of illustration is shown a preferred embodiment of my invention, the numeral 10 designates a body portion having a flat, substantially rectangular bottom 11, vertically disposed side walls 12 and 13 and rear wall 14. The side walls 12 and 13 are comparatively low adjacent the rear wall 14 and the rearward portions thereof are substantially horizontal as at 15.

The vertical front wall 16 is joined at either end thereof to the side walls 12 and 13 and the upper portion thereof curves upwardly and inwardly in overhanging relation to the said walls and is connected to the upwardly curving forward portions 17 thereof by a short vertical wall 18.

The goose-neck tubular member 19 is carried by the front wall 16 medianly thereof and communicates with the pan adjacent the bottom portion 11. The member 19 extends upwardly from its point of communication with the pan and has the discharge orifice 20 facing forwardly and disposed in a plane above the lowermost rearward portions of the side walls to prevent the contents of the pan from being expelled therefrom.

Substantially the rearward half of the pan is enclosed by a horizontally disposed top cover or apron 21 which spans the upper edges of the side walls 12 and 13 and rear wall 14. The forward portion of the apron follows the contour of the side walls and consequently curves slightly upwardly, as at 22, and forwardly divergent integral tongues 23 and 24 extend along the upwardly curved forward portions 17 of the side walls to terminate at the vertical wall 18. The apron 21 and the upper edge of the rear wall are concave in their formation to conform with the anatomical lines of the patient and forming a recess for the buttocks of the user.

A plurality of spaced brackets or sleeves 25 are carried by the side walls 12 and 13 exteriorly thereof and in a plane inclined forwardly and upwardly relative to the bottom of the pan. The rearmost bracket 25 is positioned slightly below the point at which the curved forward portions 17 of the side walls merge with the horizontal rearward portions 15 thereof, and the foremost bracket is positioned adjacent the front wall 16.

The leg supporting plates 26 are formed with a horizontally disposed concave upper surface 27 and a vertically disposed side wall 28 which carries a plurality of spaced laterally extending shanks 29. The shanks are formed with downwardly extending extremities 30 which align with and are received by the brackets 25 to hold the said leg supporting plates spaced laterally of the side walls of the pan.

The pan and leg supporting plates may be made of sheet metal and enameled, or of any appropriate material that is sanitary in character.

The apparatus is adapted to assist in removing toxic, septic, and infective waste from the body by greatly facilitating peristaltic contraction, and at the same time permitting micturition.

The pan is particularly adapted to be used by patients who are too weak or ill to be removed from the bed, and in actual operation the pan may be placed in position upon an ordinary mattress. The patient is made to assume a reclining position with the limbs spread apart and supported by the members 26. The weight of the patient's body will readily cause the same to sink into the mattress so that the apron 21 will conform to the position of the said patient. The sinking of the rearward portion of the pan will consequently effect the elevation of the forward end thereof, thus obviating the possibility of the contents of the pan spilling through the goose-neck 19.

The rearward portion of the pan is concave in its formation to comfortably accommodate the buttocks of the user and the leg supporting plates 26 are concave to conform to the curvature of the thighs. The tongues 23 and 24 of the apron 21 are bent slightly downwardly to prevent any sharp edges from contacting the body of the patient and will effectively cooperate with the leg supports in maintaining the patient in a comfortable position.

The size of the opening defined by the apron 21 and wall 18 is sufficient to permit the admission of a rubber tube such as might be used in administering a douche or colonic, and the cavity within the pan is such that the attendant may readily place the hand therein in making the proper adjustments of the discharge end of the tube.

The tongues 23 and 24 will prevent the legs of the user from being splashed with the discharges in the pan and the upwardly and inwardly curved portion of the front wall will prevent the same from soiling the bed linen.

Evacuation of the bowel through use of my improved pan therefore is readily accomplished and the patient is freed from excess efforts that would otherwise be required which, with a patient in a weakened condition, is oftentimes impossible.

It is to be understood that the form of my invention herewith shown and described, is to be taken as a preferred example of the same, and that various changes in the size, shape and arrangement of parts may be resorted to without departing from the spirit of my invention, or the scope of the appended claims.

Having thus described my invention, I claim:

1. The combination with a bedpan of the type having side walls provided with spaced brackets of leg supporting plates having laterally extending shanks, said shanks aligning with the brackets and terminating in right angularly disposed pintles adapted to be removably received by the brackets and to hold the said plates spaced laterally from the said pin.

2. A bedpan comprising a body portion of pan-like formation having side walls of less depth at one end than at the other, the deeper end of the said pan constituting the front portion thereof and having a front wall the upper portion of which curves upwardly and inwardly in overhanging relation to the forward end of the pan, the upper edges of the side walls being spanned at the lower end thereof by a cover plate adapted to receive and support the user, said cover plate being formed with forwardly extending tongues connected to the said side walls and tapering toward the juncture of the side walls with the front wall of the pan.

3. A bedpan comprising a body portion of pan-like formation having side walls of less depth at one end than at the other, the deeper end of the said pan constituting the front portion thereof and having a front wall the upper portion of which curves upwardly and inwardly in overhanging relation to the forward end of the pan, the upper edges of the side walls being spanned at the lower end thereof by a cover plate adapted to receive and support the user, said cover plate being formed with forwardly extending tongues connected to the said side walls and tapering toward the juncture of the side walls with the front wall of the pan, the leg supporting members detachably mounted on the sides of the said body portion and adapted to cooperate with the forwardly extending tongues of the said cover plate in receiving and supporting the legs of the user.

4. A bedpan comprising a body portion of pan-like formation having side walls of less depth at one end than at the other, the deeper end of the said pan constituting the front portion thereof and having a front wall the upper portion of which curves upwardly and inwardly in overhanging relation to the forward end of the pan, the upper edges of the side walls being spanned at the lower end thereof by a cover plate adapted to receive and support the user, said cover plate being formed with forwardly extending tongues connected to the said side walls and tapering toward the juncture of the side walls with the front wall of the pan, leg supporting members detachably mounted on the sides of the said body portion, said supporting members being shaped to conform to the thigh of the user and adapted to cooperate with the forwardly extending tongues of the said cover plate in receiving and supporting the same.

5. A bedpan comprising a body portion of pan-like formation having side walls of less depth at one end than at the other, the deeper end of the said pan constituting the front portion thereof and having a front wall the upper portion of which curves upwardly and inwardly in overhanging relation to the forward end of the pan, the upper edges of the side walls being spanned at the lower end thereof by a cover plate adapted to receive and support the user, said cover plate being formed with forwardly extending tongues connected to the said side walls and tapering toward the juncture of the side walls with the front wall of the pan, leg supporting members detachably mounted on the sides of the said body portion, said supporting members being disposed in a plane extending angularly upwardly toward the front of the body portion and having the top surfaces thereof shaped to conform to the thighs of the user and adapted to cooperate with the forwardly extending tongues of the said cover plate in receiving and supporting the same.

HAROLD KEMP.